United States Patent
Baier et al.

(10) Patent No.: US 11,554,486 B2
(45) Date of Patent: Jan. 17, 2023

(54) METHOD AND APPARATUS FOR PERFORMING CONTROL OF A MOVEMENT OF A ROBOT ARM

(71) Applicant: SIEMENS AKTIENGESELLSCHAFT, Munich (DE)

(72) Inventors: Stephan Baier, Unterhaching (DE); Volker Tresp, Munich (DE)

(73) Assignee: Siemens Aktiengesellschaft, Munich (DE)

(*) Notice: Subject to any disclaimer, the term of this patent is extended or adjusted under 35 U.S.C. 154(b) by 246 days.

(21) Appl. No.: 16/629,272

(22) PCT Filed: Jul. 5, 2018

(86) PCT No.: PCT/EP2018/068183
§ 371 (c)(1),
(2) Date: Jan. 7, 2020

(87) PCT Pub. No.: WO2019/008075
PCT Pub. Date: Jan. 10, 2019

(65) Prior Publication Data
US 2020/0171657 A1 Jun. 4, 2020

(30) Foreign Application Priority Data
Jul. 7, 2017 (EP) .................... 17180267

(51) Int. Cl.
*B25J 9/16* (2006.01)
(52) U.S. Cl.
CPC ............. *B25J 9/1633* (2013.01); *B25J 9/163* (2013.01); *B25J 9/1664* (2013.01); *G05B 2219/39298* (2013.01)

(58) Field of Classification Search
CPC ........ B25J 9/1633; B25J 9/163; B25J 9/1664; G05B 2219/39298; G05B 2219/39297
See application file for complete search history.

(56) References Cited

U.S. PATENT DOCUMENTS

| | | | |
|---|---|---|---|
| 2011/0178639 A1 | 7/2011 | Kwon et al. | |
| 2012/0130538 A1* | 5/2012 | Riener | G05B 19/423 700/245 |

(Continued)

FOREIGN PATENT DOCUMENTS

| | | |
|---|---|---|
| CN | 101332604 A | 12/2008 |
| CN | 102139714 A | 8/2011 |
| CN | 103279039 A | 9/2013 |

OTHER PUBLICATIONS

Zhao; Chenyang et al.; Tensor Based Knowledge Transfer Across Skill Categories for Robot Control; May 31, 2017 (Year: 2017).*

(Continued)

*Primary Examiner* — Adam R Mott
*Assistant Examiner* — Elizabeth Rose Neleski
(74) *Attorney, Agent, or Firm* — Lempia Summerfield Katz LLC

(57) ABSTRACT

A method for computing joint torques applied by actuators to perform a control of a movement of a robot arm having several degrees of freedom is provided. The method includes the act of providing, by a trajectory generator, trajectory vectors specifying a desired trajectory of the robot arm for each degree of freedom. The trajectory vectors are mapped to corresponding latent representation vectors that capture inherent properties of the robot arm using basis functions with trained parameters. The latent representation vectors are multiplied with trained core tensors to compute the joint torques for each degree of freedom.

12 Claims, 2 Drawing Sheets

(56) References Cited

U.S. PATENT DOCUMENTS

| | | |
|---|---|---|
| 2015/0120044 A1 | 4/2015 | Cory |
| 2016/0221189 A1 | 8/2016 | Nilsson |
| 2017/0106542 A1* | 4/2017 | Wolf .................. B25J 13/02 |

OTHER PUBLICATIONS

Miyamoto; Hiroyuki et al.; TOPS (Task Optimization in the Presence of Signal-Dependent Noise) Model; 2004 (Year: 2004).*

Oh; Yonghwan et al.; Extended Impedance Control of Redundant Manipulators Based on Weighted Decomposition of Joint Space; (Year: 1998).*

Zabaras; Nicholas; Linear Models Of Regression: Linear Basis Function Models, Geometry, MLE, Least Squares & Regularized Least Squares, Multiple Outputs (Year: 2014).*

Zhao; Chenyang et al.; Tensor Based Knowledge Transfer Across Skill Categories for Robot Control; May 31, 2017 (Year: 2017) (Year: 2017).*

Miyamoto; Hiroyuki et al.; TOPS (Task Optimization in the Presence of Signal-Dependent Noise) Model; 2004 (Year: 2004) (Year: 2004).*

Oh; Yonghwan et al.; Extended Impedance Control of Redundant Manipulators Based on Weighted Decomposition of Joint Space; (Year: 1998) (Year: 1998).*

Zabaras; Nicholas; Linear Models Of Regression: Linear Basis Function Models, Geometry, MLE, Least Squares & Regularized Least Squares, Multiple Outputs (Year: 2014) (Year: 2014).*

European Search Report for European Patent Application No. 17180267.1-1927 dated Dec. 19, 2017.

PCT International Search Report and Written Opinion of International Searching Authority dated Sep. 26, 2018 corresponding to PCT International Application No. PCT/EP2018/068183 filed Jul. 5, 2018.

Zhou, Cheng, et al. "Motion planning for redundant free-floating space robot with local optimization of reaction torque and joint torque simultaneously." 2016 IEEE International Conference on Robotics and Biomimetics (ROBIO). IEEE, 2016.

Oh, Yonghwan, Wan Kyun Chung, and Youngil Youm. "Extended impedance control of redundant manipulators using joint space decomposition." In Proceedings of International Conference on Robotics and Automation, vol. 2, pp. 1080-1087. IEEE, 1997.

* cited by examiner

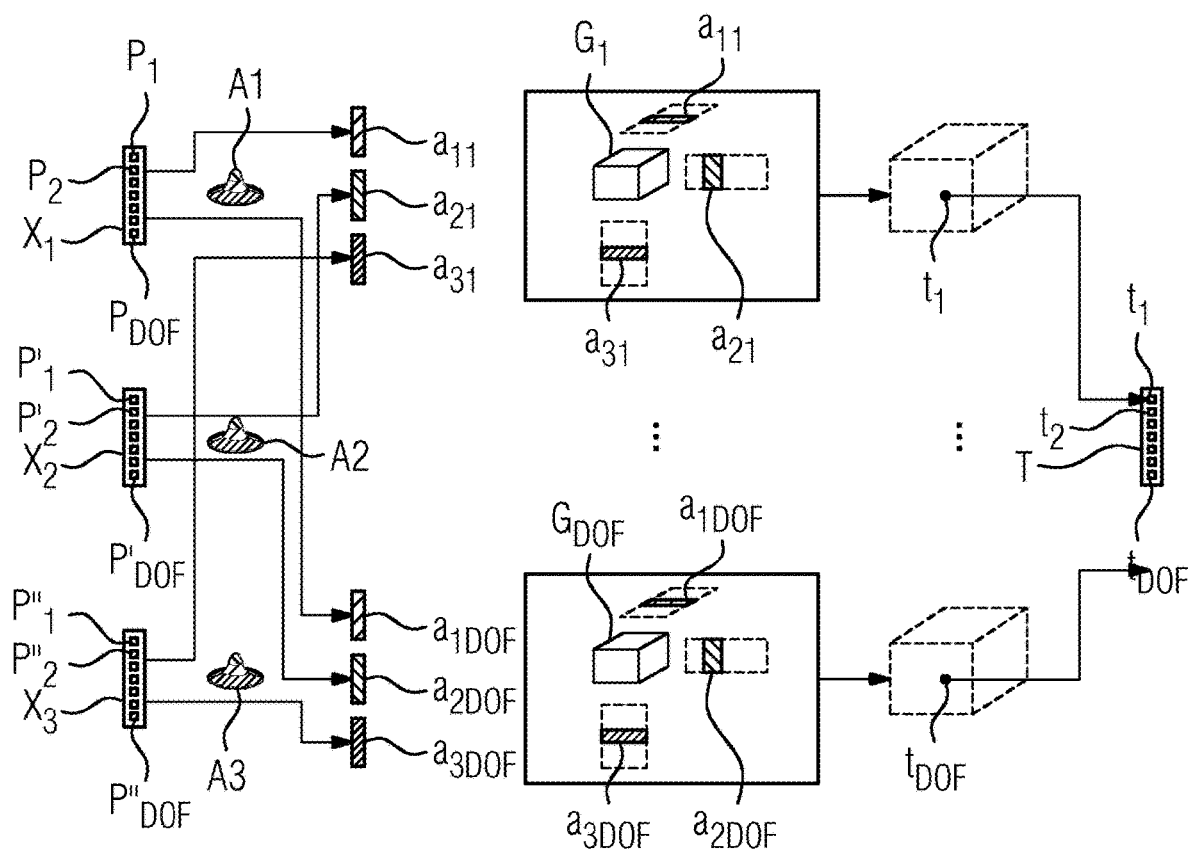

METHOD AND APPARATUS FOR PERFORMING CONTROL OF A MOVEMENT OF A ROBOT ARM

This application is the National Stage of International Application No. PCT/EP2018/068183, filed Jul. 5, 2018, which claims the benefit of European Patent Application No. EP17180267.1, filed Jul. 7, 2017. The entire contents of these documents are hereby incorporated herein by reference.

BACKGROUND

The present embodiments relate to computing joint torques applied by actuators to perform a control of a movement of a robot arm having a number of degrees of freedom.

A robot arm that may be used in a production facility may include several joints providing several degrees of freedom for the movement of the robot arm. Within model-based robot control, an inverse dynamics model may be used to compute the necessary joint torques of actuators of the robot arm for the execution of a desired movement of the respective robot arm. A feedforward control command may be calculated using a rigid-body formulation using vectors of joint positions, joint velocities, and joint accelerations. However, in practice, many nonlinearities such as friction or actuator forces may have an impact on the movement of the robot arm. Consequently, nonlinear regression techniques show a superior performance in inferring required joint torques for feedforward robot control of a robot arm. The movement of a robot arm is specified as positions, velocities, and accelerations for all degrees of freedom of the robot arm. The goal is to estimate a function from the desired movement of the robot arm to the required joint torques. Parameters of the function may be estimated offline using collected trajectories of the robot arm.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method and an apparatus for performing an accurate control of a movement of a robot arm, where the movement of the robot arm is controlled precisely, are provided. As another example, the method and the apparatus may show good performance even in the case of nonlinearities of forces having an impact on the movement of the robot arm.

In a first aspect, a method for computing joint torques applied by actuators to perform a control of a movement of a robot arm having several degrees of freedom is provided. The method includes providing, by a trajectory generator, trajectory vectors specifying a desired trajectory including a position, velocity, and acceleration of the robot arm for each degree of freedom. The trajectory vectors are mapped to corresponding latent representation vectors that capture inherent properties of the robot arm using basis functions with trained parameters, and the latent representation vectors are multiplied with trained core tensors to compute the joint torques for each degree of freedom.

In an embodiment of the method according to the first aspect, trajectory vectors specifying a monitored current trajectory of the robot arm are also fed back and compared with the trajectory vectors specifying a desired trajectory of the robot arm to calculate tracking errors and to provide a feedback control of the robot arm based on the calculated tracking errors.

In a further embodiment of the method according to the first aspect, each joint torque is calculated as the sum over the weighted outer product of the latent representation vectors.

In an alternative embodiment, each joint torque is calculated as the weighted inner product of the latent representation vectors.

In a still further embodiment of the method according to the first aspect, the basis functions include continuous basis functions.

In a possible embodiment of the method according to the first aspect, the basis functions include Gaussian basis functions.

In a further possible embodiment of the method according to the first aspect, the basis functions include linear basis functions.

In a still further possible embodiment of the method according to the first aspect, the basis functions include polynomial basis functions.

In a further possible embodiment of the method according to the first aspect, the trajectory vectors include a joint position vector of joint positions, a joint velocity vector of joint velocities, and/or a joint acceleration vector of joint accelerations.

In a possible embodiment of the method according to the first aspect, the basis functions and the core tensors are trained on a data set including joint torques and corresponding trajectories.

In a still further possible embodiment, the data set is collected during movement of the robot arm.

In a still further possible embodiment of the method according to the first aspect, the basis functions are trained using a maximum likelihood approach.

In a still further possible embodiment of the method according to the first aspect, the computed joint torques are applied to joints of the robot arm by actuators to perform a feedforward or a feedback control of the movement of the robot arm.

The present embodiments further provide, according to a second aspect, a controller for performing a control of a movement of a robot arm having several degrees of freedom. The controller may be formed by or include one or more processors.

The present embodiments provide, according to the second aspect, a controller for performing a control of a movement of a robot arm having several degrees of freedom. The control apparatus includes a trajectory generator that is configured to provide trajectory vectors specifying a desired trajectory including a position, velocity, and acceleration of the robot arm for each degree of freedom. The control apparatus also includes a computation unit (e.g., a computer; one or more processors) configured to map the generated trajectory vectors to corresponding latent representation vectors that capture inherent properties of the robot arm using basis functions with trained parameters. The computation unit is further configured to multiply the latent representation vectors with trained core tensors to compute the joint torques for each degree of freedom.

In a possible embodiment of the controller according to the second aspect, the controller is connected to actuators controlled by the controller and configured to apply the computed joint torques to joints of the robot arm to control the movement of the robot arm.

The present embodiments further provide, according to a third aspect, a robotic system.

The present embodiments provide, according to the third aspect, a robotic system including at least one robot arm having joints to which joint torques are applied by actuators controlled by a controller according to the second aspect.

In a possible embodiment of the robotic system according to the third aspect, the controller is configured to perform a feedforward control of the movement of the robot arm of the robotic system.

In a further alternative embodiment of the robotic system according to the second aspect, the controller is adapted to perform a feedback control of the movement of the robot arm of the robotic system.

In the following, possible embodiments of the different aspects are described in more detail with reference to the enclosed figures.

BRIEF DESCRIPTION OF THE DRAWINGS

FIG. 3 shows illustrates exemplary operation of a method and an apparatus according.

DETAILED DESCRIPTION

Figure 1:
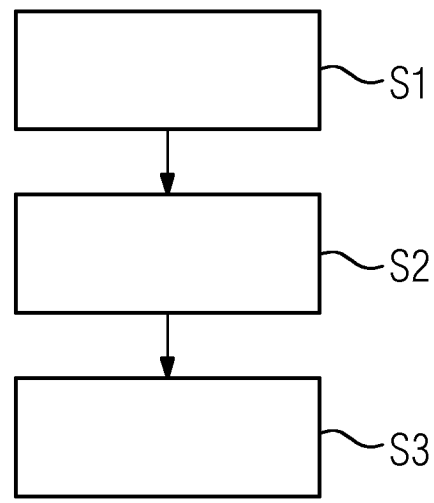
FIG. 1 shows a flowchart of an exemplary embodiment of a method for computing joint torques according to a first aspect.

As shown in the flowchart of FIG. 1, a method according to the first aspect of the present embodiments for computing joint torques applied by actuators to perform a control of a movement of a robot arm having several degrees of freedom (e.g., a plurality of degrees of freedom or a number of degrees of freedom) may include several main acts.

In a first act S1, trajectory vectors x may be provided by a trajectory generator. The trajectory vectors x specify a desired trajectory of the robot arm for each degree of freedom (DoF). The desired trajectory includes a position, velocity, and acceleration of the robot arm for each DoF.

In a second act S2, the provided trajectory vectors x are mapped to corresponding latent representation vectors a that capture inherent properties of the robot arm using basis functions A with trained parameters.

In a further act S3, the latent representation vectors a are multiplied with trained core tensors G to compute joint torques t for each DoF.

These main acts S1, S2, S3 are also illustrated schematically in FIG. 3. The trajectory vectors x may include in a possible exemplary embodiment three different vectors x1, x2, x3.

The first vector x1 is a joint position vector indicating the joint positions of all joints of the robot arm to be controlled. The joint position vector x1 includes a number of joint positions p corresponding to the DoF of the robot arm. The joint position vector x1 includes the positions P of all joints of the robot arm to be controlled.

The trajectory vectors further include a second vector x2 that is a joint velocity vector including all velocities $\dot{p}$ of the joints of the robot arm to be controlled.

The third trajectory vector x3 is a joint acceleration vector including all joint accelerations $\ddot{p}$ of the joints of the robot arm to be controlled.

The trajectory vectors x1, x2, x3 specify a desired trajectory of the robot arm for each degree of freedom. The trajectory vectors x1, x2, x3 are generated in one embodiment by a trajectory generator in act S1.

The provided trajectory vectors x1, x2, x3 are automatically mapped in the second act S2 to corresponding latent representation vectors a, which capture inherent properties of the robot arm using basis functions A1, A2, A3 with trained parameters. These basis functions A may include, in possible embodiments, Gaussian basis functions, linear basis functions, and/or polynomial basis functions. Basis functions A are continuous basis functions that are trained on a data set including joint torques t and corresponding trajectories of the robot arm. This data set may be collected during movement of the robot arm. In a possible embodiment, the basis functions A may be trained using a maximum likelihood approach.

In act S3, the latent representation vectors a are multiplied with trained core tensors G to compute the joint torques t for each DoF, as also illustrated in FIG. 3. The number of trained core tensors G corresponds to the number of degrees of freedom of the robot arm to be controlled. The result is a torque sensor T including the joint torques t1, t2 to $t_{D_oF}$ for each robot arm joint. The computed joint torques t of the torque vector T are applied to joints of the robot arm by actuators (e.g., step motors) to perform a feedforward or a feedback control of the movement of the robot arm.

In a possible embodiment, each joint torque t is calculated in act S3 as the sum over the weighted outer product of the latent representation vectors a. In an alternative embodiment, each joint torque t is calculated in act S3 as the weighted inner product of the latent representation vectors a.

In a possible embodiment, the trajectory vectors m specifying a monitored current trajectory of the robot arm are fed back and compared with the trajectory vectors specifying a desired trajectory of the robot arm to calculate tracking errors e and to provide a feedback control of the robot arm based on the calculated tracking errors e. In this embodiment, the current trajectory of the robot arm is monitored by using sensors attached to the robot arm or deployed in the vicinity of the robot arm. From the sensor data, a trajectory vector specifying a current trajectory of the robot arm is calculated and fed back for comparison with the trajectory vector x generated by the trajectory generator. The trajectory vector x specifies a desired trajectory of the robot arm. By comparing the monitored trajectory vectors with the generated desired trajectory vectors, tracking errors e may be calculated to provide a feedback control to the robot arm based on the calculated tracking errors e. Accordingly, the method according to the first aspect of the present embodiments may be used for a feedforward control or for a feedback control of the robot arm.

Figure 2:
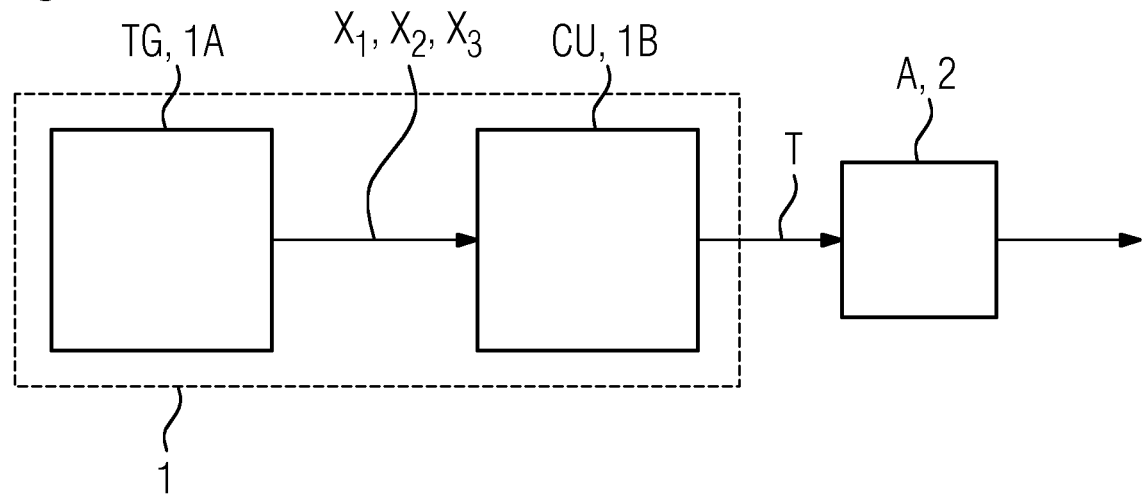
FIG. 2 shows a block diagram of an exemplary embodiment of a controller for performing a control of a movement of a robot arm according to a second aspect.

FIG. 2 shows a block diagram of a possible exemplary embodiment of a controller for performing a control of a movement of a robot arm having several degrees of freedom (e.g., a plurality of degrees of freedom or a number of degrees of freedom) according to the second aspect of the present embodiments.

In the illustrated exemplary embodiment, the control apparatus 1 (e.g., a controller) includes two main components. In the illustrated embodiment, the controller 1 includes a trajectory generator 1A that is configured to provide trajectory vectors x specifying a desired trajectory of the robot arm for each DoF. The control apparatus 1 further includes a computation unit 1B adapted to map the generated trajectory vectors x received from the trajectory generator 1A to corresponding latent representations a that capture inherent properties of the robot arm using basis functions A with trained parameters. The computation unit 1B is further configured to multiply the latent representation vectors a with trained core tensors G to compute the joint torques t for each DoF of the robot arm. As illustrated in FIG. 2, a computation unit 1B may output a torque vector T including the joint torques t for each degree of freedom DoF of the robot arm to corresponding actuators 2. The controller 1 is connected to the actuators 2, which are controlled by the controller and are configured to apply the computed joint torques t of the calculated torque vector T to joints of the robot arm to control movements of the robot arm in a three-dimensional space.

In a possible embodiment, the movement of the robot arm is controlled in a feedforward control by the forces F applied by the actuators 2 to joints of the robot arm without feedback. In an alternative embodiment, a current trajectory of the robot arm is monitored using sensors and fed back to the controller 1. In this embodiment, the computation unit 1B of the controller 1 may include a comparator that compares the trajectory vectors x generated by the trajectory generator 1A specifying a desired trajectory of the robot arm with the fed back monitored current trajectory of the robot arm. By comparing the desired trajectory vectors with the monitored trajectory vectors, tracking errors e may be calculated by the computation unit 1B to provide a feedback control of the robot arm based on the calculated tracking errors e.

The method and control apparatus according to the present embodiments are based on an approach of decomposing sparse tensors. The method and control apparatus exploit the inherent three-way interaction of positions p×velocities ṗ×accelerations p̈. The method uses basis functions A that may map continuous inputs to latent representations a of the tensor decompositions. In this way, functional versions of the tensor decompositions may be retrieved. The basis functions A also imply smoothness of the inputs such that the used data model is able to generalize well in spite of the sparsity. By using multivariate basis functions A, inputs may be grouped, such that the dimensionality of the tensor decompositions may be reduced. In the employed inverse dynamics model, the joint positions, velocities, and accelerations of all degrees of freedom DoF of the robot arm are grouped, resulting in a tensor Y of dimension three. This allows a Tucker decomposition to be applied. The number of degrees of freedom of the robot arm may vary depending on the use case.

Tensor decompositions form a generalization of a low rank matrix factorization to higher order tensors. There are different ways of decomposing a higher order tensor.

The Tucker decomposition factorizes a tensor $Y \in \mathbb{R}^{d_1 \times \cdots \times d_S}$ into S matrices, including latent representation for all entities in each mode. The tensor elements are expressed by the interaction of the latent representations, weighted by a core tensor $G \in \mathbb{R}^{\hat{r} \times \cdots \times \hat{r}}$ such that $$Y(v_1, \ldots, v_S) \approx \quad (1)$$

$$\sum_{r_1, \ldots, r_S}^{\hat{r}} G(r_1, \ldots, r_S) \cdot A_1(v_1, r_1) \cdot A_2(v_2, r_2) \cdot \ldots \cdot A_S(v_S, r_S)$$

with $A_i \in \mathbb{R}^{d \times \hat{r}}$. The Tucker decomposition does not scale to high dimensions, as the core tensor G grows exponentially with the dimensionality of the tensor.

A special case of the Tucker decomposition is the low-rank PARAFAC decomposition, where the core tensor G is diagonal. All other interactions are left out, such that $$Y(v_1, v_2, \ldots, v_S) \approx \sum_{r=1}^{\hat{r}} g(r) \cdot A_1(v_1, r) \cdot A_2(v_2, r) \cdot \ldots \cdot A_S(v_S, r) \quad (2)$$

with $g \in \mathbb{R}^{\hat{r}}$. As PARAFAC only models the diagonal of the core tensor G, parameters of the PARAFAC scale linearly with the order of the tensor.

A regression problem is considered with $S \in \mathbb{N}$ discrete input variables. Each of the input variables $v_i$ for $i \in \{1, \ldots, S\}$ assumes one out of $F_i \in \mathbb{N}$ discrete values. A dependent variable y considered a regression function for a data set of N training examples $\{y^j, (v_1^j, \ldots v_S^j)\}_{j=1}^N$ is provided.

All training data samples are mapped to a sparse tensor $Y \in \mathbb{R}^{F_1 \times \cdots \times F_S}$. The tensor is filled with $$Y=(v_1^j, \ldots, v_S^j)=y^j \forall j \in \{1, \ldots, N\} \quad (3)$$

The remaining entries of the tensor, which do not occur in the training data, are left unknown. This results in Y being a sparse tensor.

The tensor Y is approximated using a low-rank tensor decomposition (e.g., the PARAFAC decomposition (see equation (2))). Using low ranks for $\hat{r}$, the approximation results in a dense tensor Φ. The dense tensor Φ describes the outcome Y for all combinations of the input variables $(v_1, \ldots, v_S)$. However, it is difficult to compute and store the whole approximated tensor Φ; thus, only the parameters of the decomposition are stored. When predicting Y for a new set of input variables, the representations for that tuple are indexed, and the approximation may be computed on demand.

The proposed model only works for a discrete input space. The proposed model does not yet imply any smoothness on the values of the input variables. Although, this makes the proposed model a powerful, highly non-linear model, the proposed model is prone to overfitting. If the input values follow a natural ordering or if the input values are discretized from a continuous scale, the model requires more training samples to learn the smoothness implicitly. To introduce smoothness explicitly and to extend the model to continuous inputs, smooth basis functions A for the latent parameters of the decomposition are used. Instead of indexing the latent representation from a matrix, values of the latent representations are computed using basis functions A. For example, all $A_i$ in equation (2) may be modeled using a radial basis function $$A_i = exp(-\gamma_{i,r_i} \|\mu_{i,r_i} - v_i\|^2) \quad (4)$$

This allows for continuous inputs $v_i \in \mathbb{R}$. The latent representation is modeled based on the closeness of the input to the center of the radial basis function A. In this way, similar inputs induce similar representations. The parameters of the basis function A are optimized during training to yield optimal regression results. The chosen low rank r is a hyperparameter, which determines the number of basis functions A and therefore the model complexity. Also, a mixture of discrete and continuous inputs may easily be modeled and used by applying the basis functions A only to continuous inputs and learning representation matrices for the discrete input variables. It is also possible to group multiple inputs together into one tensor mode, such that $v_i \in \mathbb{R}^m$, where $m \in \mathbb{N}$ denotes the number of grouped inputs. In this way, the representation of a tensor mode is calculated given a vector of continuous inputs. The grouping of input variables reduces the dimensionality of the tensor decomposition and thus the number of free parameters.

A functional Tucker model for the approximation of the joint torques t necessary to perform a movement of a robot arm may be used. FIG. 3 shows the model schematically. A robot arm with $c \in \mathbb{N}$ degrees of freedom DoF is considered. The vectors $x_1$, $x_2$, $x_3$ describe the desired positions p, velocities $\dot{p}$, and accelerations $\ddot{p}$ for each of the c degrees of freedom. The vector $y \in \mathbb{R}^c$ describes the corresponding joint torques t.

The function $y=f(x_1, x_2, x_3)$ may be modeled using a functional tensor decomposition model. Each input vector x is modeled by one dimension in the tensor decomposition, resulting in third-order tensors Y, which describe the joint torques t. Each element of the vector y may be modeled in a separate model. The resulting three-dimensional tensors of the form positions x velocities x accelerations are then factorized using the Tucker decomposition with limited rank, resulting in a tensor $\Phi \approx Y$, such that $$\Phi(x_1, x_2, x_3) = \sum_{r_1, r_2, r_3}^{\tilde{r}} \mathcal{G}(r_1, r_2, r_3) \cdot A_1(x_1, r_1) \cdot A_2(x_2, r_2) \cdot A_3(x_3, r_3) \tag{5}$$

$A_1$ to $A_3$ are basis functions that map from the c-dimensional input to the latent representations of the Tucker model. The representations may be modeled using multivariate Gaussian kernels, such that $$A_i(x_i, r_i) = \exp(-(\mu_{i,r_i} - x_i)^T D_{i,r_i} (\mu_{i,r_i} - x_i)) \forall i \in \{1,2,3\}, \tag{6}$$

with $\mu_{i,r_i} \in \mathbb{R}^c$ representing the centers and $D_{i,r_i} \in \mathbb{R}^{c \times c}$ weighing the distance from the centers in the c-dimensional input space. The closer a data point is to the center of a basis function A, the higher is an activation. Thus, the centers of the basis functions A may be seen as landmarks in the input space. All three-way interactions between the representations of the three input dimensions are explicitly modeled and weighted by the elements of the core tensor G.

Model training may be based on a maximum likelihood approach. The negative log-likelihood of the collected data set $\{y^j, (x_1^j, x_2^j, x_3^j)\}_{j=1}^N$ is minimized as follows:

$$l = \log \sum_{j=1}^N p(y^j | x_1^j, x_2^j, x_3^j, \Theta), \tag{7}$$

where $\Theta$ includes the parameters of the decomposition and the basis functions A. Assuming a Gaussian distribution, the squared error cost function below is provided $$C = \sum_{j=1}^N (Y(x_1^j, x_2^j, x_3^j) - \Phi(x_1^j, x_2^j, x_3^j))^2 \tag{8}$$

The cost function C considers only known elements of the tensor (e.g., the sparsity of the tensor is exploited). Equation (8) may be minimized using gradient descent. As experimentally found, the stochastic optimization algorithm Adam works best for this task. Adam dynamically optimizes the learning rate individually for each parameter. The sampling of stochastic mini-batches for each update has also been shown as advantageous for speeding up training. To avoid overfitting, the training may be stopped when the performance on a validation set does not further improve.

The centers of the Gaussian kernel may be initialied in a preprocessing step, using k-means clusterings, such that $$J_i = \sum_{r_i}^{\tilde{r}} \sum_{x_i^j \in C_{i,r_i}} \|x_i^j - \mu_{i,r_i}\|^2 \tag{9}$$

are minimized for $i \in \{1, \ldots, 3\}$, where C contains $\tilde{r}$ clusters for each of the three modes. All matrices D are initialized with the identity matrix. The elements of the core tensor G may be initialized randomly with a Gaussian distribution of mean zero and standard deviation 0.05. While training, all parameters are further optimized.

The number of degrees of freedom may vary according to the use case. For example, a robot arm may include seven degrees of freedom. Further, data may be collected from the moving robot arm at varying sampling rates. The data may, for example, be collected from the moving robot at a frequency of 100 Hz for a time period of 7.5 minutes of movement. Such a dataset includes 21 input dimensions consisting of seven joint positions, seven joint velocities, and seven joint accelerations. In this specific example, a first trajectory vector x1 includes seven position values p indicating the seven positions of the seven joints, the second trajectory vector x2 includes seven velocity values $\dot{p}$ indicating the seven velocities of the seven joints, and the third trajectory vector x3 includes seven joint acceleration values $\ddot{p}$ indicating the accelerations of the seven joints of the robot arm. With the above-mentioned sampling rate, the complete data set consists in this specific example of 42,482 samples. In one embodiment, the data set may be split into a training data set and into a test data set. For example, 90% of the received data set may be used for training, and 10% of the received data set may be used as test data. Further, a percentage of the training set may be used as a validation data set. The model is learned on the training data set, which models the seven joint torques t given positions, velocities, and accelerations. As baseline models, linear regression, RBF-networks, and support vector regression may be used. Using the Tucker decomposition of a high dimensional sparse tensor allows for modeling a three-way interaction (e.g., positions×velocities×accelerations). In a possible embodiment, using stochastic gradient descent for training allows to only consider known elements in the tensor. This increases the computational feasibility of the decomposition. The use of basis functions A such as a Gaussian kernel allows for a mapping from continuous inputs to the latent representation a of the tensor decomposition. Further, the used basis functions A introduce smoothness such that similar inputs induce similar latent representations.

The method and controller according to the present embodiments allow for a more accurate feedforward robot control of the robot arm. This may further result in lower feedback gains and potentially less energy consumption when moving the robot arm. The method may also be used to reduce the engineering effort for tuning feedback controllers. The accurate feedforward robot control provided by the method according to the first aspect of the present embodiments may be beneficial, for example, for production robots or CNC machines.

Any tensor decomposition model may be used for the proposed method according to the first aspect of the present embodiments (e.g., PARAFAC, Tucker2). For parameter optimization, various techniques may be used (e.g., variants of stochastic gradient descent (RMSprop, Adam, etc.), alternating least squares, or second order methods). With the method according to the present embodiments, a regression model is used based on tensor factorization for modeling an inverse dynamics function. The method is based on a decomposition of sparse tensors that include only a small number of entries. Representing the data with high dimensional sparse tensors Y forms the basis for the approximation of complex highly nonlinear functions. The decomposition of sparse tensors may be applied to a regression problem. With the method according to the present embodiments, the decomposition is applied to continuous inputs by learning or mapping from the continuous inputs to the latent representations a of the tensor decomposition using basis functions A. The method may be applied to a data set that consists of trajectories of a robot arm having several degrees of freedom DoF.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for computing joint torques applied by actuators to perform a control of a movement of a robot arm having a number of degrees of freedom, the method comprising:
   providing, by a trajectory generator, trajectory vectors specifying a desired trajectory, the desired trajectory comprising a position, a velocity, and an acceleration of the robot arm for each of the number of degrees of freedom;
   mapping, using basis functions with trained parameters, the trajectory vectors specifying the desired trajectory to corresponding latent representation vectors that capture inherent properties of the robot arm, the trajectory vectors being inputs to the basis functions with the trained parameters, and the trained parameters of the basis functions having been trained on a data set including historical joint torques and corresponding trajectories;
   computing the joint torques for each of the number of degrees of freedom, the computing of the joint torques comprising multiplying the corresponding latent representation vectors with trained core tensors, the trained core tensors having been trained on the data set; and
   performing a feedforward or a feedback control of the movement of the robot arm based on the provided trajectory vectors specifying the desired trajectory, the performing of the feedforward or the feedback control comprising applying the computed joint torques to joints of the robot arm by the actuators.

2. The method of claim 1, wherein each of the joint torques is calculated as a sum over a weighted outer product of the latent representation vectors.

3. The method of claim 1, wherein each of the joint torques is calculated as a weighted inner product of the latent representation vectors.

4. The method of claim 1, wherein the basis functions comprise continuous basis functions.

5. The method of claim 4, wherein the basis functions comprise Gaussian basis functions, linear basis functions, polynomial basis functions, or any combination thereof.

6. The method according to of claim 1, wherein the trajectory vectors comprise a joint position vector, a joint velocity vector, a joint acceleration vector, or any combination thereof.

7. The method of claim 1, wherein the data set is collected during movement of the robot arm.

8. The method of claim 1, wherein the basis functions are trained using a maximum likelihood approach.

9. A controller for performing a control of a movement of a robot arm having several a number of degrees of freedom, the controller comprising:
   a trajectory generator that is configured to provide trajectory vectors specifying a desired trajectory of the robot arm for each of the number of degrees of freedom;
   a processor configured to:
      map, using basis functions with trained parameters, the generated trajectory vectors specifying the desired trajectory to corresponding latent representation vectors that capture inherent properties of the robot arm, the trajectory vectors being inputs to the basis functions with the trained parameters, and the trained parameters of the basis functions having been trained on a data set including historical joint torques and corresponding trajectories; and
      compute the joint torques for each of the number of degrees of freedom, the computation of the joint torques comprising multiplication of the latent representation vectors with trained core tensors.

10. The controller of claim 9, wherein the controller is connected to actuators controlled by the controller, the actuators being configured to apply the computed joint torques to joints of the robot arm to control the movement of the robot arm.

11. A robotic system comprising:
   a controller; and
   at least one robot arm having joints to which joint torques are applicable by actuators controlled by the controller, each robot arm of the at least one robot arm having a number of degrees of freedom,
   wherein the controller comprises:
      a trajectory generator that is configured to provide trajectory vectors specifying a desired trajectory of the respective robot arm for each of the number of degrees of freedom; and
      a processor configured to:
         map, using basis functions with trained parameters, the generated trajectory vectors specifying the desired trajectory to corresponding latent representation vectors that capture inherent properties of the respective robot arm, the trajectory vectors being inputs to the basis functions with the trained parameters, and the trained parameters of the basis functions having been trained on a data set including historical joint torques and corresponding trajectories; and compute the joint torques for each of the number of degrees of freedom, the computation of the joint torques comprising multiplication of the latent representation vectors with trained core tensors.

12. The robotic system of claim 11, wherein the controller is configured to perform a feedforward or a feedback control of the movement of the at least one robot arm of the robotic system.

* * * * *